US006308815B1

(12) United States Patent
Keith (10) Patent No.: US 6,308,815 B1
(45) Date of Patent: Oct. 30, 2001

(54) ROTATABLE PALLET CHANGING APPARATUS, SYSTEM AND METHOD

(75) Inventor: Malcolm E. Keith, Algonquin, IL (US)

(73) Assignee: Midaco Corporation, Elke Grove Village, IL (US)

( * ) Notice: Subject to any disclaimer, the term of this patent is extended or adjusted under 35 U.S.C. 154(b) by 0 days.

(21) Appl. No.: 09/418,738

(22) Filed: Oct. 15, 1999

(51) Int. Cl.[7] ................................................. B65G 43/08
(52) U.S. Cl. ............................................... 198/346.1
(58) Field of Search ............................ 198/346.1, 346.2; 29/33 P (56) References Cited

U.S. PATENT DOCUMENTS

| 3,825,245 | * | 7/1974 | Osburn et al. ............. 198/346.1 X |
| 4,144,960 | | 3/1979 | Scourtes . |
| 4,480,738 | * | 11/1984 | Mattson ........................ 198/346.1 |
| 4,705,445 | | 11/1987 | Morita et al. . |
| 4,712,283 | * | 12/1987 | Bertorello ................. 198/346.1 X |
| 4,797,989 | * | 1/1989 | Cherko ...................... 198/346.1 X |
| 4,799,582 | | 1/1989 | Itoh . |
| 4,859,137 | | 8/1989 | Bonora et al. . |
| 4,934,031 | | 6/1990 | Maeda et al. . |
| 4,970,765 | | 11/1990 | Sakawa et al. . |
| 4,995,502 | | 2/1991 | Kitamura . |
| 5,018,617 | | 5/1991 | Miyata et al. . |
| 5,038,920 | | 8/1991 | Nelson . |
| 5,062,190 | | 11/1991 | Kitamura . |
| 5,067,703 | | 11/1991 | Keith . |
| 5,099,981 | | 3/1992 | Guzzoni . |
| 5,161,662 | | 11/1992 | Kuse . |
| 5,167,405 | | 12/1992 | Cayley, Jr. . |
| 5,249,662 | | 10/1993 | Nakano et al. . |
| 5,265,487 | * | 11/1993 | Curless ....................... 198/346.1 X |
| 5,286,148 | | 2/1994 | Cayley, Jr. . |
| 5,346,051 | | 9/1994 | Keith . |
| 5,370,212 | | 12/1994 | Misutani et al. . |
| 5,813,514 | | 9/1998 | Keith . |

FOREIGN PATENT DOCUMENTS

| 58-223553 | * | 12/1983 | (JP) .................... 198/346.1 |
| 3-149153 | * | 6/1991 | (JP) .................... 198/346.1 |
| 5 104415 | | 10/1991 | (JP) . |
| 4 63658 | | 2/1992 | (JP) . |
| 63 16942 | | 1/1998 | (JP) . |

* cited by examiner

Primary Examiner—James R. Bidwell
(74) Attorney, Agent, or Firm—Patents +TMS, P.C.

(57) ABSTRACT

A rotatable pallet changing apparatus, a system and a method are provided in which the rotatable pallet changing system has a rotatable bed having a first pallet and a second pallet side-by-side and set on tracks. A first and a second workpiece may be set upon a first pallet and a second pallet, respectively. As the first pallet with the first workpiece is drawn into a machining center to be worked upon, the second workpiece may be added to the second pallet. When the first workpiece on the first pallet is finished being worked upon, it is withdrawn from the machining center and placed upon the rotatable bed. The rotatable bed then rotates, allowing the second pallet to be fed into the machining center and further allowing the first workpiece to be off-loaded from the first pallet.

20 Claims, 5 Drawing Sheets

ROTATABLE PALLET CHANGING APPARATUS, SYSTEM AND METHOD

BACKGROUND OF THE INVENTION

The present invention generally relates to a rotatable pallet changer. More specifically, the present invention relates to a rotatable pallet changer for use with an automatic machining center. Further, the present invention relates to a rotatable pallet changer and automatic machining center system. In addition, the present invention relates to a method for using the same.

It is, of course, generally known to provide automatic machining centers which employ a bed which is movable in a horizontal plane in two dimensions. Further, it is known to employ an automatic pallet changer employing a workpiece positioned on the pallet and having a draw plate for up and down motion of a pallet resting on the draw plate. Such a receiver is disclosed, for example, in U.S. Pat. No. 5,492,214. Parts being machined in the automatic machining center are fixed to the pallet by an operator.

Such machining centers have a vertically sliding door for closing off an entrance in the machining center enclosure. At the beginning or end of the machining center, the pallet is either moved into or out of the machining center by the automatic pallet changer. When the pallet is outside the enclosure, then it is accessible for a worker to either remove or mount the workpiece being machined.

Further, it is generally known to provide a pallet changer to automatically move first and second pallets into or out of the machining enclosure of the machining center. Such a pallet changer is previously disclosed in U.S. Pat. No. 5,813,514, for example, the disclosure of which is incorporated herein in its entirety. In the '514 patent, first and second pallets are employed such that a worker may be working with one of the pallets while the pallet is outside the machining center while the other pallet is inside the machining enclosure. The pallets can then be automatically exchanged.

Finally, it is generally known to provide an automatic pallet system whereby an automatic pallet changer is provided having first and second tracks provided side-by-side, with each track having a respective pallet associated with it. A chain-like horizontal loop is provided between the two tracks. A single dog is provided on the chain for ultimately engaging with the two pallets. Thus, one pallet is pulled out of the machining center enclosure and, thereafter, the second pallet is brought into the enclosure as the chain continues rotation.

However, these known pallet systems having tracks side-by-side only allow a worker to change the machined part on one track on one side of the pallet changer. If the worker wants to change the pallet on the other track, the worker must move his location to the other side of the pallet changer to do so. This causes a worker to waste time and energy moving from one side of the pallet changer to the other.

A need, therefore, exists for an improved pallet changing apparatus, system and method whereby the pallet changer rotates and a worker needs only to stand on one side of the pallet changer to change the pallet on either track.

SUMMARY OF THE INVENTION

The present invention provides a rotatable pallet changing apparatus, a system and a method of using the same. The rotatable pallet changer allows a worker to stand on a single side and change workpieces on pallets on tracks situated side by side.

To this end, in an embodiment of the present invention, a rotating automatic pallet changing apparatus for automatically moving a pallet into and out of a machining center is provided. The apparatus has a rotatable bed having a first and a second pallet thereon. A powered linear drive unit is provided. The powered linear drive unit has a carriage that moves along a longitudinally extending carriage guide wherein the carriage is capable of engaging and selectively moving the first or second pallet.

In an embodiment, at least one set of tracks on the rotatable bed is provided.

In an embodiment, a dog extends from the carriage capable of engaging the first pallet or the second pallet.

In an embodiment, a first pin associated with the rotatable bed is provided for engaging the first pallet and locking the first pallet to the rotatable bed.

In an embodiment, a locking means associated with the rotatable bed is provided for locking the rotatable bed.

In an embodiment, a second pin associated with the rotatable bed is provided for locking the second pallet to the rotatable bed.

In an embodiment, a powered engagement means associated with the powered linear drive unit is provided for engaging the carriage to the first pallet or to the second pallet.

In another embodiment of the present invention, a rotatable pallet changing system is provided. The system has an automatic pallet changer having a rotatable bed having a first pallet and a second pallet thereon. A powered linear drive unit has a carriage that moves along a longitudinally extending carriage guide. The carriage is capable of engaging and selectively moving the first pallet or the second pallet. A machining area has a platform capable of receiving the first pallet or the second pallet. A control means associated with the system is provided for selectively cycling the first pallet and the second pallet into and out of the machining area.

In an embodiment, a sensor is capable of indicating the position of the rotatable bed.

In an embodiment, a door separates the automatic pallet changer and the machining area. A door driving means moves the door into an open position or a closed position.

In an embodiment, a motor is provided for rotating the rotatable bed.

In an embodiment, the control means controls the rotation of the rotatable bed and determines whether the first pallet or the second pallet is in a position to be loaded into the machining area. The control means further controls the engagement of the carriage to the first or second pallet. The control center controls the movement of the carriage along the longitudinally extending carriage guide thereby moving the first pallet or the second pallet into and out of the machining area.

In an embodiment, the control means controls movement of the door.

In another embodiment of the present invention, a method of changing a pallet in an automatic machining system is provided. The method comprises the steps of: providing a rotatable bed having a first and a second pallet thereon; placing a first workpiece on the first pallet; and providing a machining area adjacent the rotatable bed, the machining area having a platform capable of receiving the first pallet or the second pallet.

In an embodiment, the bed is rotated such that the first pallet aligns with the platform contained in the machining area.

In a embodiment, a powered linear drive unit is provided having a carriage which moves along a longitudinally extending carriage guide wherein the carriage is capable of engaging the first pallet or the second pallet. The first pallet is engaged with the carriage. The carriage and the first pallet are moved off of the rotatable bed and onto the platform contained in the machining area.

In an embodiment, a second workpiece is placed on the second pallet.

In an embodiment, the first pallet is removed from the machining area and is placed onto the rotatable bed. A locking pin is provided associated with the rotatable bed capable of locking the first pallet to the rotatable bed. The locking pin is engaged to the first pallet. The bed is rotated such that the second pallet aligns with the platform contained in the machining area.

It is, therefore, an advantage of the present invention to provide a rotatable pallet changing apparatus, a system and a method that has two side-by-side tracks.

Another advantage of the present invention is to provide a rotatable pallet changing apparatus, a system and a method that rotates and allows one pallet to be fed into a machining center while another is worked on or changed by a worker.

Yet another advantage of the present invention is to provide a rotatable pallet changing apparatus, a system and a method that alternately feeds two parts to be machined into a machining center on two different tracks that are side by side.

A still further advantage of the present invention is to provide a rotatable pallet changing apparatus, a system and a method that allows a worker to stand on a single side of the pallet changer and change either workpiece without having to move to the other side of the pallet changer.

Further, an advantage of the present invention is to provide a rotatable pallet changing apparatus, a system and a method that provides for automatic changing of the pallets within the machining center.

Another advantage of the present invention is to provide a rotatable pallet changing apparatus, a system and a method that allows a worker to safely change a pallet without exposing the worker to dangerous machine parts.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
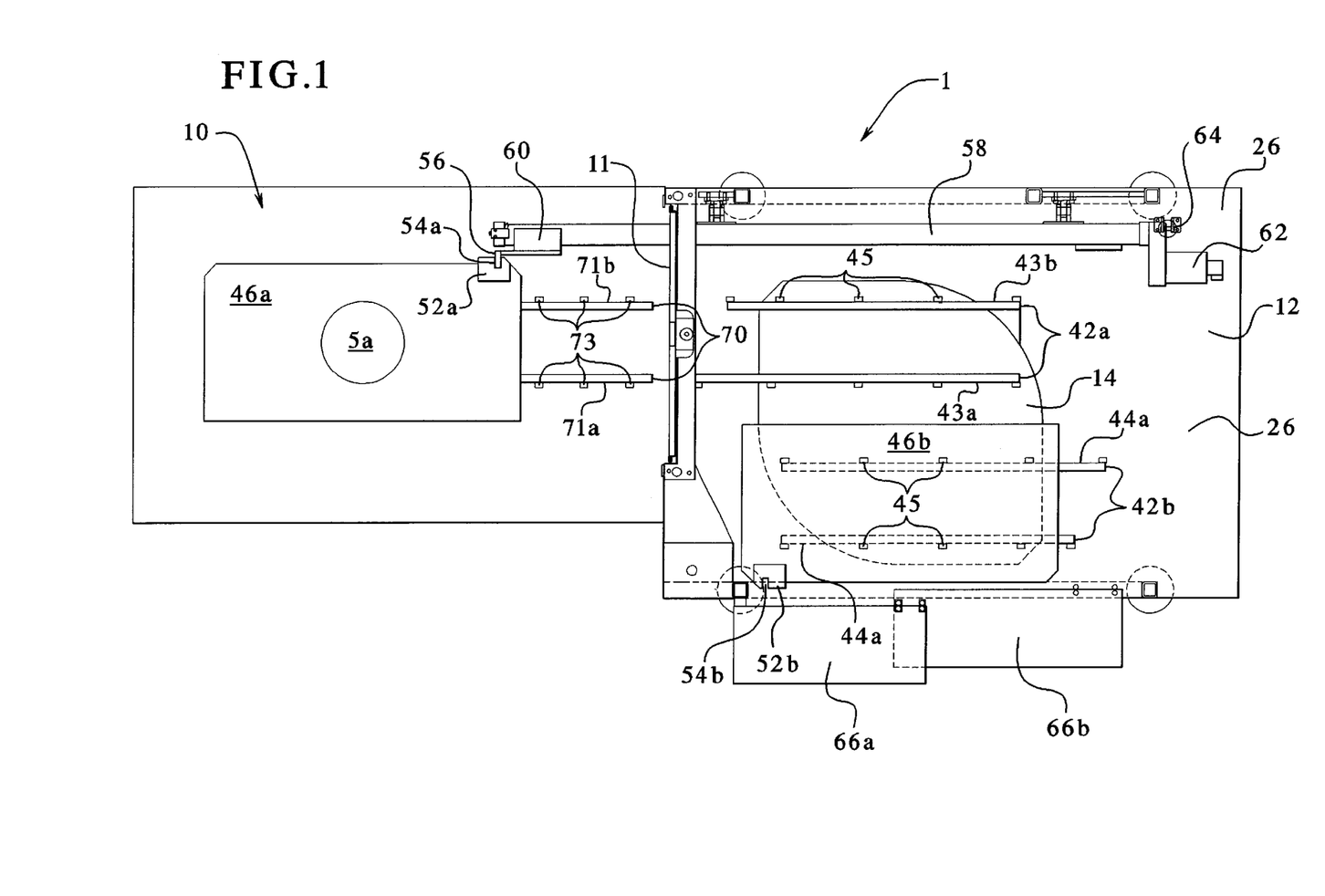
FIG. 1 illustrates a top view of an embodiment of a machining center and a pallet changing center having a rotatable pallet changer according to the present invention.

The present invention relates to a rotatable pallet changer, a system and a method of using the same. FIG. 1 illustrates a top view of an embodiment of a pallet changing system 1 having a machining center 10 and a pallet changing center 12. The machining center 10 and the pallet changing center 12 may be adjacently disposed. A door 11 may provide access from the pallet changing center 12 to the machining center 10.

The pallet changing center 12 may have a rotatable bed 14 having two sets of tracks 42a,42b. The two sets of tracks 42a,42b may be disposed side-by-side on the rotatable bed 14. Each set of tracks 42a,42b may have two single tracks 43a,43b and 44a,44b, respectively, set side-by-side. Each of the tracks 43a,43b and 44a,44b may have a plurality of wheels 45. The machining center 12 may have a set of tracks 70 having two single tracks 71a,71b disposed side-by-side. A plurality of wheels 73 may also be provided on each of the tracks 71a,71b.

Two pallets 46a,46b having workpieces 5a and 5b, respectively, may be placed on the sets of tracks 42a,42b, respectively. Either one of the pallets 46a or 46b may be moved into the machining center 10 from the pallet changing center 12, however. For example, as shown in FIG. 1, the pallet 46a within the machining center 10 sits on the set of tracks 70 while the pallet 46b sits on the set of tracks 42b. Alternatively, the pallet 46b may be within the machining center 10 on the set of tracks 70 while the pallet 46a sits on the set of tracks 42a. The rotatable bed 14 may allow either pallet 46a,46b to be lined up with the set of tracks 70 in the machining center 10 and thereafter moved into the machining center 10.

Each of the pallets 46a,46b may have an extension 52a,52b, respectively, attached to a side of the pallets 46a,46b. Each extension 52a,52b may have a slot 54a 54b therein.

Disposed in the pallet changing center 12 and extendable into the machining center 10 may be an extending carriage guide 58 having a carriage 60 attached thereto. A dog 56 may be attached to the carriage 60. A linear drive unit motor 62 may be provided to drive the carriage 60 along the extending carriage guide 58. A carriage guide rotator 64 may allow the extending carriage guide 58 to rotate slightly. This, in turn, may rotate the dog 56 and may allow the dog 56 to engage the slots 54a or 54b of the extensions 52a or 52b, respectively, contained on the pallets 46a,46b, respectively. When the dog 56 is aligned with either of the slots 54a or 54b of either of the pallet 46a or 46b, the carriage guide rotator 64 may rotate the extending carriage guide 58 which, in turn, may engage the dog 56 into the slot 54a or 54b. The linear drive unit motor 62 may then move the carriage 60 along the extending carriage guide 58 thereby moving either of the pallets 46a or 46b along the tracks 42 or 44, respectively, out of the pallet changing center 12 into the machining center 10 and vice versa.

Disposed on a side of the pallet changing center 12 may be doors 66a,66b that may allow a worker to have access to an interior of the pallet changing center 12. The exterior doors 66a,66b may be disposed only on one side of the pallet changing center 12.

The door 11 may be provided between the machining center 10 and the pallet changing center 12. The door 11 may allow a pallet 46a,46b to be moved within the machining center 10 when open. The door 11 may close when the article to be machined is within the machining center 10. For safety purposes, in order for the machining center 10 to operate and work on the article, the exterior doors 66a,66b and the side door 11 may need to be closed. This may eliminate the ejection of material out of the machining center 10 and thereby injuring a worker, for example.

Figure 2:
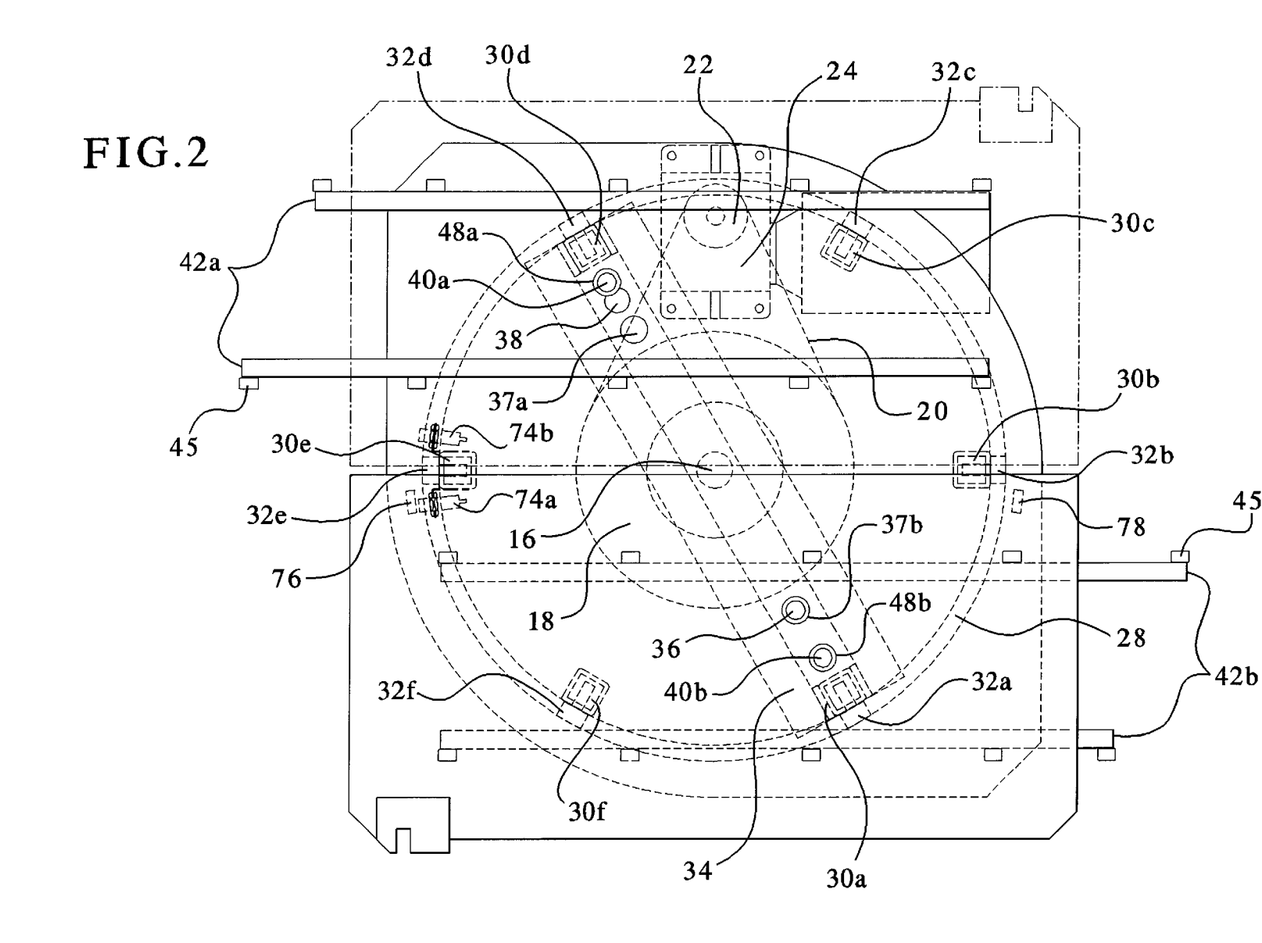
FIG. 2 illustrates a top view of an embodiment of the rotatable bed pallet changing center according to the present invention.

FIG. 2 shows an enlarged view of the rotatable bed 14 and relevant machinery attached thereto. The rotatable bed 14 may have a center axis 16 around which the rotatable bed 14 rotates. The axis 16 may extend underneath the rotatable bed 14 and may be attached to a pulley 18 having a belt 20 attached thereto. The belt 20 may further be attached to a second pulley 22. The second pulley 22 may be rotatable and may further be attached to a motorized unit 24. The motorized unit 24 may rotate the second pulley 22 thereby moving the belt 20. The belt 20 may subsequently rotate the pulley 18 which causes the axis 16 to rotate. Rotation of the axis 16 may cause the rotatable bed 14 to rotate. Other methods of rotating the rotatable bed 14 are contemplated and the invention is not meant to be limited in the above-identified manner.

The rotatable bed 14 may have a circular track 28 provided on an underside of the rotatable bed 14. A plurality of posts 30a, 30b 30c, 30d, 30e and 30f may upwardly extend from a bottom 26 of the pallet changing center 12. The plurality of upwardly extending posts 30a, 30b, 30c, 30d, 30e and 30f each may have wheels 32a, 32b, 32c, 32d, 32e and 32f attached thereto. The wheels 32a, 32b, 32c, 32d, 32e and 32f may fit within the track 28. The rotatable bed 14 may sit upon the wheels 32a, 32b, 32c, 32d, 32e and 32f. This may allow the rotatable bed 14 to rotate smoothly and easily.

A bar 34 may be disposed between the posts 30a and 30d beneath the rotatable bed 14. The bar 34 may extend directly through the axis 16 of the rotatable bed 14. A rotatable bed locking pin 36 may be provided attached to the bar 34. The pin 36 may engage in an aperture 37a or 37b contained in an underside 15 of the rotatable bed 14. The apertures 37a, 37b may be disposed on opposite sides of the rotatable bed 14. The pin 36 may engage the rotatable bed 14 and lock the rotatable bed 14 thereby prohibiting the rotation of the rotatable bed 14.

Figure 3:
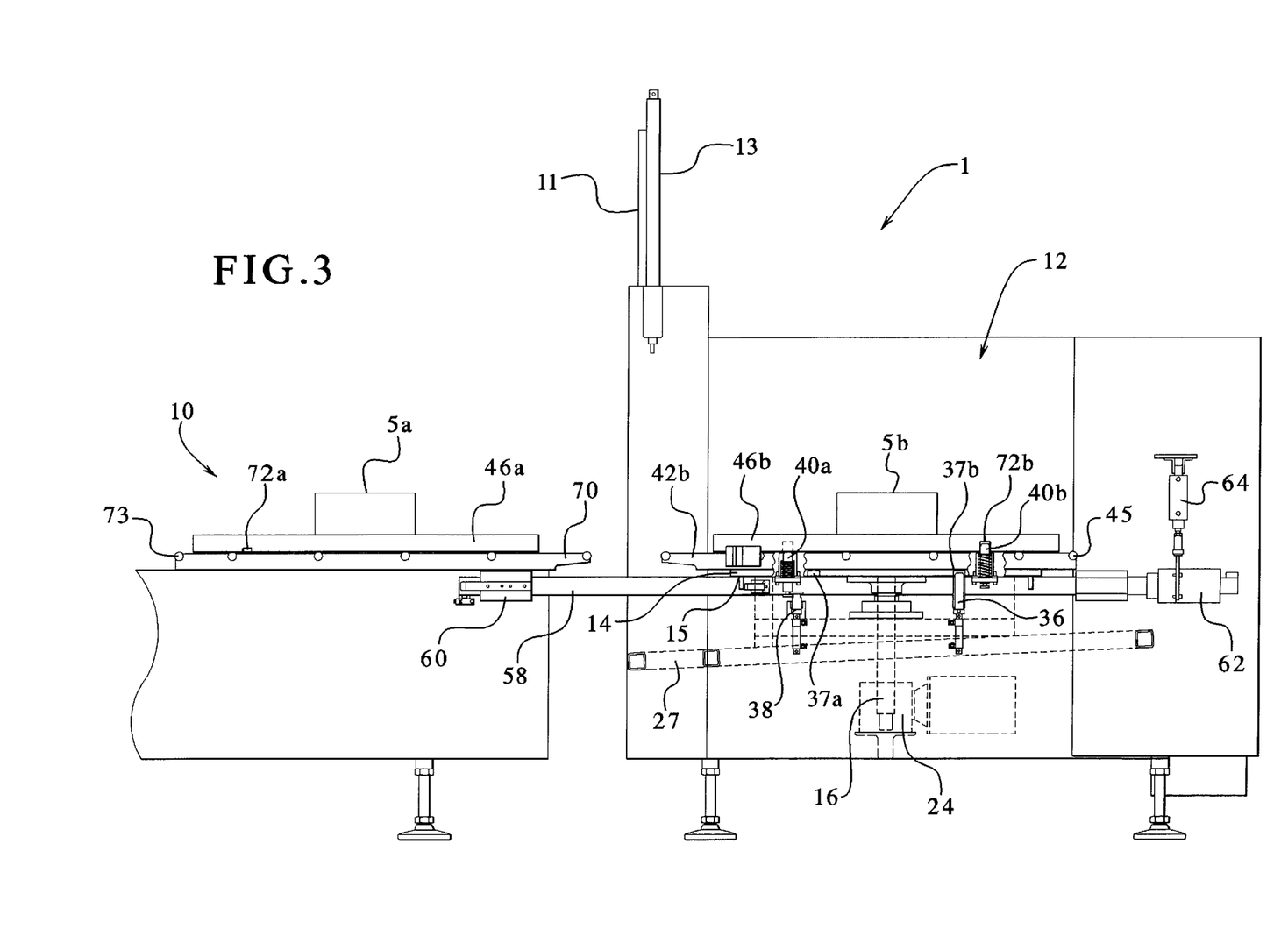
FIG. 3 illustrates a side view of the pallet changing center and machining center according to the present invention.

A pallet locking pin 38 may be provided attached to the bar 34. The pallet locking pin 38 may engage either of two spring loaded pins 40a or 40b that sit on an underside 15 of the rotatable bed 14 (as shown in FIG. 3). The spring loaded pins 40a,40b may extend upwardly into and through an aperture 48a,48b, respectively, that may extend entirely through the rotatable bed 14. The apertures 48a,48b may be disposed in opposite ends of the rotatable bed 14. When the spring-loaded pins 40a,40b are extended, they may engage a slot 72a or 72b contained within an underside of the pallets 46a or 46b, respectively (as shown in FIG. 3). When the pallet 46a or 46b is in position to be fed into the machining center 10, the pallet locking pin 38 may engage the spring loaded pin 40a or 40b and may draw it downward thereby disengaging the spring loaded pin 40a or 40b from the slot 72a or 72b of the pallet 46a or 46b. The pallet 46a or 46b may then be free to move along the set of tracks 42a or 42b.

Fixed to the base 30e beneath the rotatable bed 14 may be two sensors 74a, 74b. Sensing posts 76 and 78 may be disposed on opposite ends of the rotatable bed 14 and may extend downward from the rotatable bed 14. When the rotatable bed 14 is in a position to feed the pallet 46a into the machining center 10, the sensing post 76 may align with the sensor 74a, thereby indicating to the control means 100 the position of the rotatable bed 14. Alternatively, when the rotatable bed 14 is in a position to allow the pallet 46b to be fed into the machining center 10, the sensing post 78 aligns with the sensor 74b,thereby indicating the same to the control means 100.

Provided on the rotatable bed 14 may be the two sets of tracks 42a and 42b. Each set of tracks 42a,42b may contain the two single tracks 43a,43b and 44a, 44b, respectively, disposed side-by-side. The two sets of tracks 42a,42b may be attached to the rotatable bed 14 and disposed on opposite ends of the rotatable bed 14. A plurality of wheels 45 may be provided attached to each of the tracks 43a,43b and 44a,46b.

FIG. 3 illustrates a side view of an embodiment of the present invention. The system 1 may contain the machining center 10 and the pallet changing center 12 adjacently disposed. The door 11 is shown in an upward position. A hydraulic lift 13 may open and close the door 11 to allow a pallet 46a or 46b to pass therethrough.

The pallet 46a having a workpiece 5a is shown within the machining center 10 on the set of tracks 70. The pallet 46b having a workpiece 5b is shown on the set of tracks 42b.

The slots 72a,72b may be contained within an underside of the pallets 46a,46b,respectively. The pallet locking pin 38 is shown engaged to the spring-loaded pin 40a. The spring-loaded pin 40a is shown in a downward position thereby allowing the pallet 46a to move freely into the machining center 10. The spring-loaded pin 40b is shown in a position to engage the aperture 72 of the pallet 46b. From this position, when the rotatable bed is in a position to allow the pallet 46b to be loaded into the machining center 10, the pallet locking pin 38 may engage the pin 40b drawing the spring loaded pin 40b downward and releasing the pallet 46b,thereby allowing the pallet 46b to roll on the set of tracks 42b. When the rotatable bed 14 is in any other position other than the positions that allow either of the pallets 46a and 46b to be fed into the machining center 10, the spring-loaded pins 40a,40b may be disengaged from the pallet locking pin 38 and may be engaged to either of the slots 72a and 72b, respectively, thereby locking the pallets 46a and 46b to the rotatable bed 14.

The rotatable bed locking pin 36, disposed on the bar 34, may engage the rotatable bed 14. When the rotatable bed 14 is in a position to allow either of the pallets 46a or 46b to be loaded into the machining center 10, the rotatable bed locking pin 36 engages either of the apertures 37a or 37b on the underside 15 of the rotatable bed 14, thereby locking the rotatable bed 14 and prohibiting the rotation of the rotatable bed 14.

Disposed adjacent the disposable bed 14 may be the extending carriage guide 58, the motor 62, the carriage guide rotator 6, the carriage 60 and the dog 56. The carriage 60 is shown engaged to the pallet 46a.

A base 27 of the pallet changing center 12 may slant downwards allowing any waste liquids to drain from the pallet changing center 12 when either of the pallets 46a or 46b are removed from the machining center 10.

Figure 4:
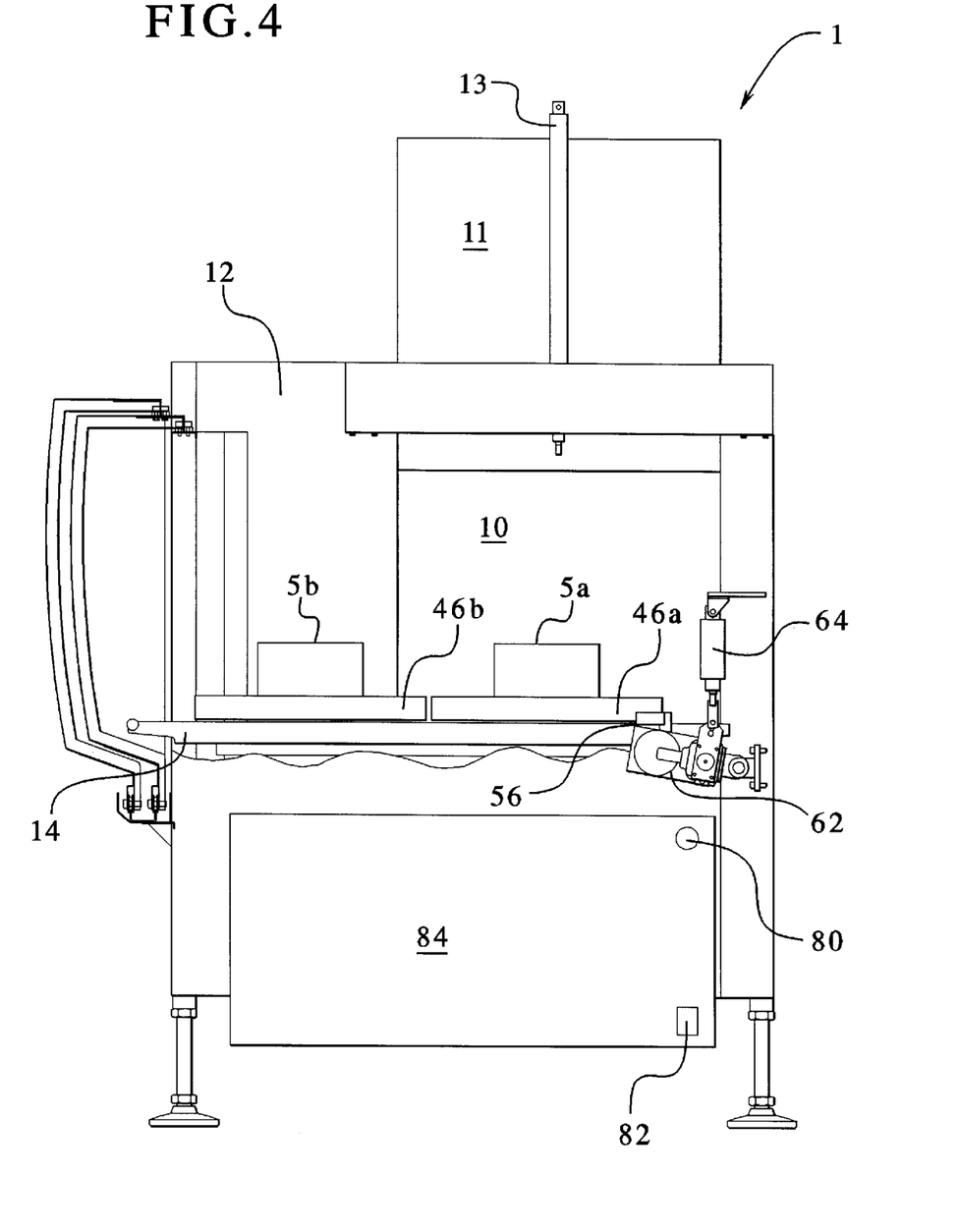
FIG. 4 illustrates a side view of an embodiment of the pallet changing center according to the present invention.

FIG. 4 shows a back side view of another embodiment of the system 1 cut away to show the interior of the pallet changing center 12. The pallet changing center 12 may contain the two pallets 46a,46b disposed side-by-side on the rotatable bed 14 having the workpieces 5a,5b disposed thereon, respectively. The door 11 is shown in an open position permitting access to the machining center 10. The linear drive unit motor 62 may provide power to extend the carriage 60. The carriage guide rotator 64 may rotate the carriage 60 thereby engaging the dog 56 to the pallet 46a.

A start button 80 may be disposed on a back panel 84 and may set the system 1 in motion or provide power to the system 1. An emergency stop button 82 may be provided on the back panel 84 to allow a worker to stop the system 1 if the need arises.

Figure 5:
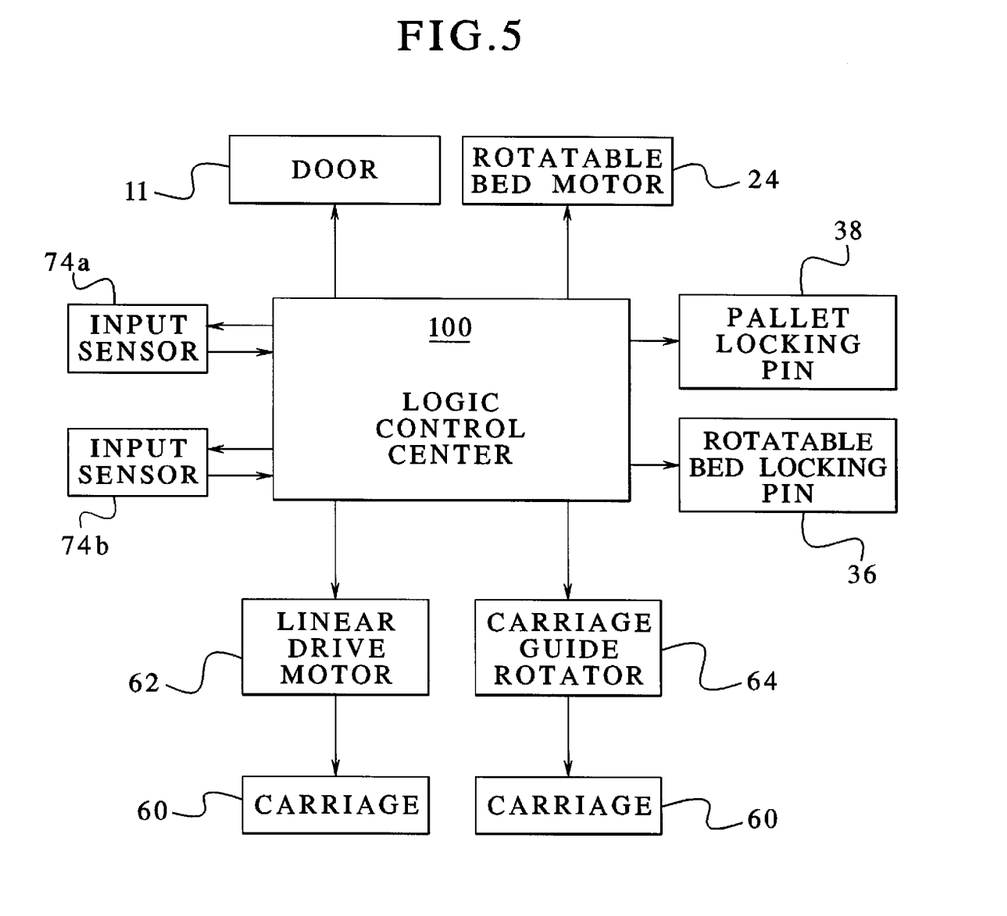
FIG. 5 illustrates a black box diagram of an embodiment of a system control center that controls the automatic pallet changer according to the present invention.

FIG. 5 shows a black box diagram of a control means 100 of an embodiment of the present invention. The control means 100 may control the various motors and sensors of the system 1. The control means 100 may send a signal to both of the sensors 74a, 74b. If the sensor 74b reads the sensing post 78, then the control means 100 identifies that the pallet 46b is in position to be fed into the machining center 10. However, if the rotatable bed sensor 74 senses the sensing post 76, then the control means 100 interprets that the pallet 46a is in position to be fed into the machining center 10.

The control means 100 may control the linear drive motor 62 thereby causing the carriage 60 to move along the extending carriage guide 58. Also, the control means 100 may control the carriage guide rotator 64 when a pallet 46a,46b is in position to be loaded into the machining center 10, the carriage guide rotator 64 may rotate the carriage 60 engaging the dog 56 to the respective pallet 46a,46b.

Additionally, the control means 100 may control the rotatable bed locking pin 36. When the rotatable bed 14 is in position to allow the pallet 46a or 46b to be loaded into the machining center 10, the rotatable bed locking pin 36 may engage the rotatable bed 14 in the aperture 37a or 37b thereby preventing the rotatable bed 14 from rotating. Additionally, the control means 100 may control the pallet locking pins 40a,40b. When the rotatable bed 14 is in any position except a position allowing either of the pallets 46a or 46b to be loaded into the machining center 10, the pallet locking pins 40a,40b may engage the pallets 46a,46b, respectively, through the slots 72a,72b, respectively, thereby prohibiting the pallets 46a,46b from moving.

The control means 100 may also control the rotatable bed motor 24 causing the rotatable bed 14 to rotate clockwise or counterclockwise. Finally, the control means 100 may control the door 11. When the door 11 is in an open position, either of the pallets 46a or 46b may be fed into the machining center 10. The control means 100 may coordinate the movements of the various motors to load either of the pallets 46a or 46b into the machining center 10 while allowing the other one of the pallets 46a or 46b not contained within the machining center 10 to be worked on, replaced or otherwise changed by a worker, for example.

In use, the two pallets 46a,46b may be disposed side-by-side on the rotatable bed 14 and locked into place by the spring loaded pins 40a, 40b. The workpiece 5a to be worked upon in the machining center 10 may be placed on the pallet 46a. The control means 100 may disengage the rotatable bed locking pin 36 from the rotatable bed 14. The motor 24 may then rotate the rotatable bed 14 one hundred and eighty degrees (180°) so that the pallet 46a is disposed on the opposite side of the rotatable bed 14 and in the position to be fed into the machining center 10.

The rotatable bed locking pin 36 may then engage the rotatable bed 14 thereby prohibiting it from rotating. The pallet locking pin 38 may engage the spring loaded pin 40a thereby allowing the pallet 46a to freely move along the track 42a. The door 11 may then be raised by the hydraulic lift 13. The motor 62 of the linear drive unit 58 may cause the carriage 60 to be in the position where the dog 56 may be rotated into the slot 54a of the extensions 52a of the pallet 46a. The motor 62 then may move the carriage 60 which then may move the pallet 46a into the machining center 10 after the door 11 has opened.

As the workpiece 5a is machined, a worker may then load a second workpiece 5b on the pallet 46b which is now closest to the worker. When the workpiece 5a is finished in the machining center 10, the carriage 60 may draw the pallet 46a back onto the rotatable bed 14. The pallet locking pin 38 may then disengage from the spring-loaded pin 40a thereby causing the spring-loaded pin 40a to lock the pallet 46a to the rotatable bed 14. Further, the rotatable bed locking pin 36 may disengage from the rotatable bed 14 allowing the rotatable bed 14 to freely rotate. The motor 24 may then rotate the rotatable bed 14 so that the pallet 46b is in a position to be loaded into the machining center 10. The workpiece 5a may then be off-loaded from the pallet 46a by the worker while the second workpiece 5b disposed on the pallet 46b is being machined in the machining center 10.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A rotating automatic pallet changing apparatus for automatically moving a pallet, the apparatus comprising:
   a rotatable bed having a surface wherein the surface has an area that only accommodates a first pallet and a second pallet thereon; and
   a powered linear drive unit having a carriage that moves along a longitudinally extending carriage guide wherein the carriage engages and selectively moves each of the first pallet and the second pallet.

2. The apparatus of claim 1 further comprising:
   at least one set of tracks on the rotatable bed.

3. The apparatus of claim 2 further comprising:
   a set of wheels associated with the at least one set of tracks.

4. The apparatus according to claim 1 further comprising:
   a dog extending from the carriage capable of engaging the first pallet or the second pallet.

5. The apparatus according to claim 1 further comprising:
   a first pin associated with the rotatable bed for engaging the first pallet and locking the first pallet to the rotating bed.

6. The apparatus of claim 1 further comprising:
   a second pin associated with the rotatable bed for engaging the second pallet and locking the second pallet to the rotatable bed.

7. The apparatus of claim 1 further comprising:
   a locking means associated with the rotatable bed for locking the rotatable bed.

8. The apparatus of claim 1 further comprising:
   a powered engagement associated with the powered linear drive unit means for engaging the dog to the first pallet or the second pallet.

9. A rotatable pallet changing system comprising:
   an automatic pallet changer having a rotatable bed, the rotatable bed having a first pallet and a second pallet thereon;
   a powered linear drive unit having a carriage that moves along a longitudinally extending carriage guide, the carriage engages and selectively moves each of the first pallet and the second pallet;
   a machining area having a platform that receives the first pallet and the second pallet wherein the machining area directly receives the first pallet and the second pallet from the rotatable bed; and
   a control means associated with the system wherein the control means selectively cycles the first pallet and the second pallet into and out of the machining area.

10. The system of claim 9 further comprising:
a sensor capable of indicating position of the rotatable bed.

11. The system of claim 9 further comprising:
a door separating the automatic pallet changer and the machining area and further wherein a door driving means associated with the door moves the door into an open position or a closed position.

12. The system according to claim 11 wherein the control means controls movement of the door.

13. The system according to claim 9 further comprising:
a motor for rotating the rotatable bed.

14. The system according to claim 9 wherein the control means controls the rotation of the rotatable bed and determines whether the first pallet or the second pallet is in a position to be loaded into the machining area.

15. The system according to claim 9 wherein the control means controls the engagement of the carriage to the first pallet or the second pallet and further wherein the control means controls the movement of the carriage along the longitudinally extending carriage guide, thereby moving the first pallet or the second pallet into and out of the machining area.

16. A method of changing a pallet in an automatic machining system, the method comprising the steps of:

providing a rotatable bed having a first pallet and a second pallet thereon;

placing a first workpiece on the first pallet; and providing a machining area having a platform that directly receives the first pallet and the second pallet from the rotatable bed wherein the machining area has a carriage that moves along a longitudinally extending carriage guide that engages and selectively moves each of the first pallet and the second pallet.

17. The method according to claim 16 further comprising the step of:

rotating the bed such that the first pallet aligns with the platform contained in the machining area.

18. The method according to claim 16 further comprising the steps of:

providing a powered linear drive unit having a carriage which moves along a longitudinally extending carriage guide, the carriage capable of engaging the first pallet or the second pallet;

engaging the first pallet with the carriage; and moving the carriage and the first pallet from the rotatable bed and onto the platform contained in the machining area.

19. The method according to claim 16 further comprising the step of:

placing a second workpiece on the second pallet.

20. The method according to claim 16 further comprising the step of:

removing the first pallet from the machining area and placing the first pallet onto the rotatable bed;

providing a locking pin associated with the rotatable bed capable of locking the first pallet to the rotatable bed;

engaging the locking pin to the first pallet; and rotating the bed such that the second pallet aligns with the platform contained in the machining area.

* * * * *